US010389803B1

(12) United States Patent
Ducrou et al.

(10) Patent No.: US 10,389,803 B1
(45) Date of Patent: *Aug. 20, 2019

(54) DISTRIBUTING DATA TO GROUPS OF USER DEVICES

(71) Applicant: Amazon Technologies, Inc., Seattle, WA (US)

(72) Inventors: Jon Robert Ducrou, Seattle, WA (US); Brandon J. Smith, Seattle, WA (US); Kenneth O. Sanders, II, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/880,493

(22) Filed: Oct. 12, 2015

Related U.S. Application Data

(63) Continuation of application No. 13/623,806, filed on Sep. 20, 2012, now Pat. No. 9,160,605.

(51) Int. Cl.
*G06F 15/16* (2006.01)
*H04L 29/08* (2006.01)
*H04L 29/06* (2006.01)

(52) U.S. Cl.
CPC ........ *H04L 67/1044* (2013.01); *H04L 65/403* (2013.01)

(58) Field of Classification Search
CPC ....... H04L 63/20; H04L 63/101; H04L 63/04; H04L 12/185; G06F 8/65; H04M 1/72525; H04M 1/7253

USPC ......... 709/204, 205–207, 217–219, 223–226
See application file for complete search history.

(56) References Cited

U.S. PATENT DOCUMENTS

| | | |
|---|---|---|
| 6,505,031 B1 | 1/2003 | Slider et al. |
| 7,783,986 B2 | 8/2010 | Barsness et al. |
| 2002/0119433 A1 | 8/2002 | Callendar |
| 2005/0289642 A1 | 12/2005 | Pacholec et al. |
| 2006/0115803 A1* | 6/2006 | Kalisiak ................. G09B 5/00 434/323 |
| 2008/0010601 A1 | 1/2008 | Dachs |
| 2009/0327855 A1 | 12/2009 | Le |
| 2010/0146115 A1* | 6/2010 | Bezos .................... H04L 12/66 709/225 |
| 2012/0260163 A1* | 10/2012 | Kim ..................... G06F 3/0483 715/273 |
| 2013/0004930 A1* | 1/2013 | Sorenson ................ G09B 7/02 434/350 |
| 2013/0091240 A1* | 4/2013 | Auger ................... G06F 17/241 709/217 |
| 2013/0151974 A1* | 6/2013 | Cho ...................... G06F 17/212 715/733 |

(Continued)

*Primary Examiner* — Ruolei Zong
(74) *Attorney, Agent, or Firm* — Lowenstein Sandler LLP

(57) ABSTRACT

A computing device receives, from one or more user accounts in a group of user accounts, display information associated with presentation of data associated with a media item and generated in association with a first user account on user devices associated with the one or more user accounts in the group. The computing device generates a report comprising statistics associated with display of the data, wherein the statistics are determined from the display information and comprise an amount of time for which the data was presented on the user devices associated with the one or more user accounts in the group.

17 Claims, 11 Drawing Sheets

(56) References Cited

U.S. PATENT DOCUMENTS

| | | | |
|---|---|---|---|
| 2013/0212454 A1* | 8/2013 | Casey | G06Q 10/10 |
| | | | 715/203 |
| 2013/0246157 A1* | 9/2013 | Puppin | G06Q 30/02 |
| | | | 705/14.36 |
| 2014/0019562 A1 | 1/2014 | Le Chevalier et al. | |
| 2014/0033265 A1* | 1/2014 | Leeds | G06F 21/10 |
| | | | 726/1 |

* cited by examiner

DISTRIBUTING DATA TO GROUPS OF USER DEVICES

RELATED APPLICATIONS

This application is a continuation of U.S. patent application Ser. No. 13/623,806, filed Sep. 20, 2012, the entire contents of which are hereby incorporated by reference herein.

BACKGROUND

A large and growing population of users enjoy entertainment through the consumption of media items, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), portable media players, tablet computers, electronic pads, netbooks, desktop computers, notebook computers, and the like. Electronic textbooks may also be offered for electronic devices. Currently, most electronic devices are associated with a single user. For a user who has multiple electronic devices, data may be synchronized between those electronic devices. However, traditional systems that manage synchronization of data between electronic devices do not synchronize any data between groups of devices where the devices are controlled by different users.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Figure 1A:
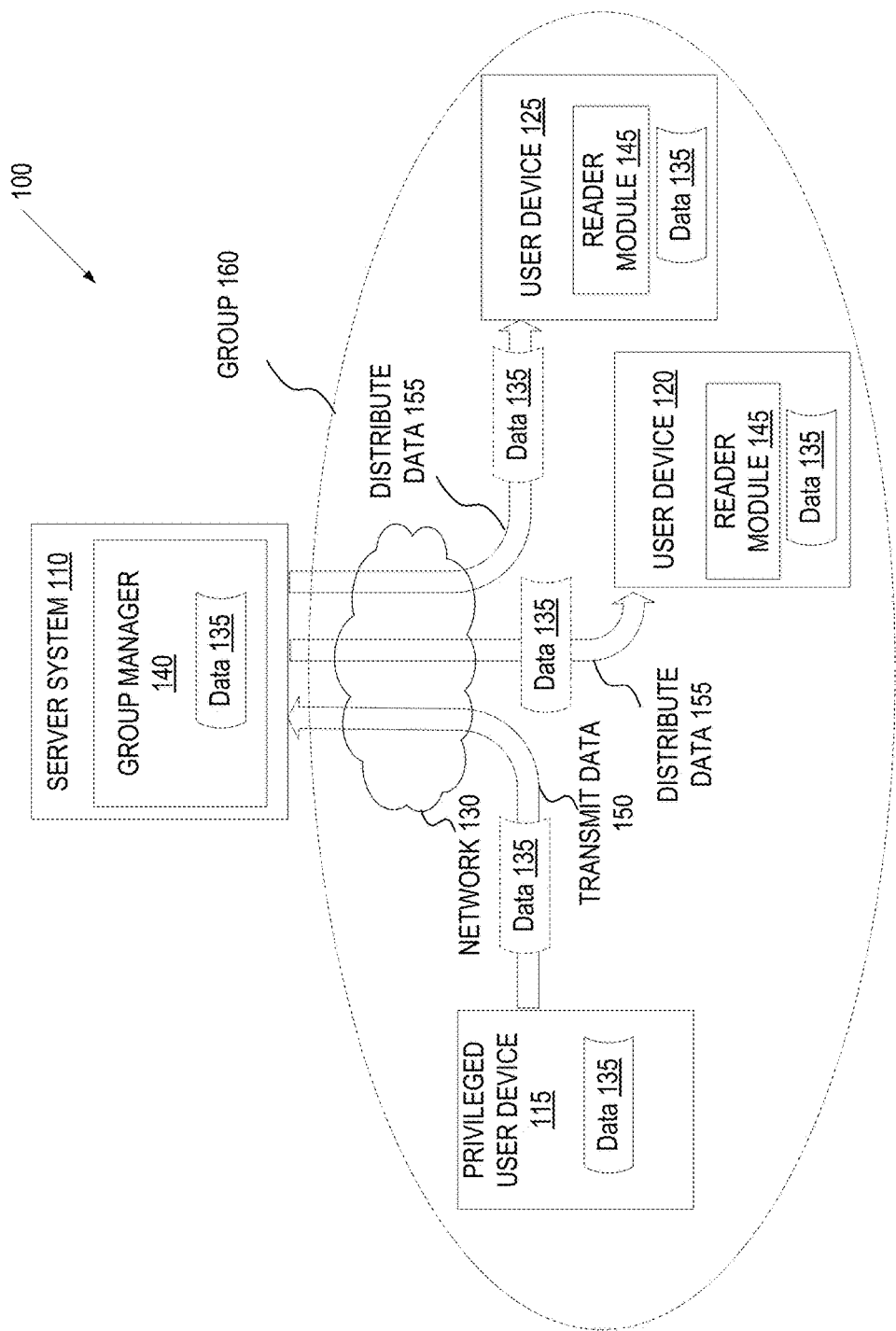
FIG. 1A illustrates distribution of data between a group of user devices, in accordance with embodiments of the present invention.

Methods and systems for managing and distributing data to groups of user devices are described. Multiple user devices may be registered to a single master account, which may be, for example, a corporate account of an enterprise or an educational account of a school or university. The master account may include multiple user accounts, each of which may be assigned to a particular user and associated with a particular user device. These user accounts may be arranged into groups. Examples of such groups include subjects, classes, work units, and so forth. One or more user accounts in a group may be a privileged account. For example, in a classroom environment, the group may be a class, the privileged account may belong to an instructor, and the other non-privileged user accounts in the group may be associated with students. Alternatively, there may be no privileged accounts in a group, or all user accounts in a group may be granted the capabilities of privileged accounts. For example, in a workplace environment, all user accounts may be privileged accounts. Additionally, a privileged account may be associated with a group but not actually be a member of the group.

A user of a privileged account for a group (or associated with the group) may generate data associated with an electronic publication or other media item. The data may be, for example, a note or annotation associated with a particular passage or chapter of an electronic publication, highlighting for one or more passages, voiceover for a passage, bookmarks (e.g., for assigned reading passages), and so forth. A group manager may then distribute this data to each of the user devices associated with the other user accounts in the group. Therefore, an instructor may distribute lessons, annotations, highlights, etc. to the user devices of students in a user friendly manner. As used herein, an instructor may be a teacher, professor, tutor etc. in an educational setting such as a school, college or university. An instructor may also be a presenter, manager or knowledgeable individual in a corporate environment who provides information to other employees or individuals. As the students view the data on their user devices or from other devices that have access to their user accounts, those user devices (or the other devices) may send confirmations to the group manager. The group manager may then generate a report, and send this report to the user device associated with the privileged account.

Note that though each user account is associated with a particular user device, in some embodiments the content of each user account may additionally be accessed from other user devices, from media consumer applications (e.g., electronic book (ebook) reader applications installed onto a tablet computer, personal computer or mobile phone), and/or from a web interface (e.g., from an ebook reader application accessible from a server via a web browser). Embodiments of the present invention are discussed with reference to operations performed on, and data sent to, specific user devices that may be owned by and/or associated with a master account holder. However, it should be understood that any of the operations and functions that are described herein with reference to such user devices may also apply to additional user devices that belong to individual users, media consumer applications (e.g., ebook reader applications) and/or a media consumer service accessible via a web interface. Therefore, if a user is logged in to his user account via a web interface, or a media consumer application, the user may still receive data from a privileged account of the group (or associated with, but not a member of, the group).

As used herein, an electronic publication is an electronic version of a printed publication. Examples of electronic publications include electronic books (e.g., which may be encoded in the electronic publication (EPUB), Archos diffusion (AEH), broadband ebooks (BBeB), comic book archive file (CBR), compiled HM, eReader, FictionBook, iBook, Kindle format 8 (KF8), Mobi 7, AZW, etc. formats), electronic magazines, digital newspapers, electronic journals, real simple syndication (RSS) feeds, hypertext markup language (HTML) documents, extensible markup language (XML) documents, extensible hypertext markup language (XHTML) documents, scalable vector graphics (SVG) documents, and so forth. For simplicity and clarity of the concepts presented herein, embodiments of the present application are discussed with reference to electronic publications. However, it should be understood that embodiments also apply to other types of media items such as digital audio (e.g., mp3 files, AAC files, etc.), digital images, digital video (e.g., data that has been encoded in the Windows Media®, Real Media®, Quicktime®, motion picture expert group (MPEG) 4 (also known as MP4) or Flash® video file formats), and other types of digital media.

FIG. 1A illustrates a system 100 that manages a group of user devices 115, 120, 125. The user devices 115-125 may be portable computing devices such as an electronic book reader, notebook computer, mobile phone, tablet computer, personal digital assistant (PDA), portable media player, netbook, and the like. The user devices 115-125 may also be non-portable computing devices such as a desktop computer, a set-top box associated with a television, a gaming console, and so on. The user devices 115-125 may be configured with functionality to enable the viewing of electronic publications and/or other media items.

The group 160 may be a group of user devices and associated user accounts, each of which may be associated with a master account. The user devices may include a privileged user device 115 and a collection of standard (non-privileged) user devices 120, 125. The privileged user device 115 may be a user device associated with a privileged account the group 160. The standard user devices 120, 125 may be user devices associated with standard user accounts (also referred to as participant or non-privileged user accounts) in the group 160. In a classroom environment, the privileged user device may be a user device of a teacher, and the other user devices 120, 125 may be user devices of students.

A user of privileged user device 115 may generate data 135 that is associated with an electronic publication or other media item. The generated data 135 may be a note or annotation for an electronic publication, for a chapter of an electronic publication, or for a passage of an electronic publication. For example, a teacher may provide comments to help a student's understanding of reading material. These comments may later appear within an electronic publication alongside a passage or chapter that is being commented on. The data 135 may additionally include highlights to text (e.g., passages that the teacher believes are especially important). The data may additionally include a voiceover, such as a brief lecture associated with a passage or chapter of assigned reading. Other types of data 135 may also be generated at the privileged user device 115 or otherwise provided by the privileged account.

The privileged user device 115 transmits 150 the data 135 via a network 130 to a server system 110. The server system 215 may include a group manager 140 that manages the group 160. Group manager 140 may determine which user devices 120, 125 are included in group 160, and may distribute 155 the data 135 to those user devices 120, 125. User devices 115-125 may each include a reader module 145 that can display, play or otherwise present the data. For example, the reader module 145 may incorporate the received data during loading and/or rendering of the electronic publication. Therefore, the data 135 may be presented on the user devices 120, 125 alongside passages of an electronic publication that the data 135 is associated with. For example, if the data 135 is an annotation providing additional information about a passage of text in an electronic publication, when a user device 120, 125 presents that passage of text it may also present the annotation. This may enable a student to read the annotation in the context of the associated passage. The group manager 140 may ensure that all user devices 120, 125 in the group receive a copy of the data 135. This facilitates learning in a classroom setting.

Figure 1B:
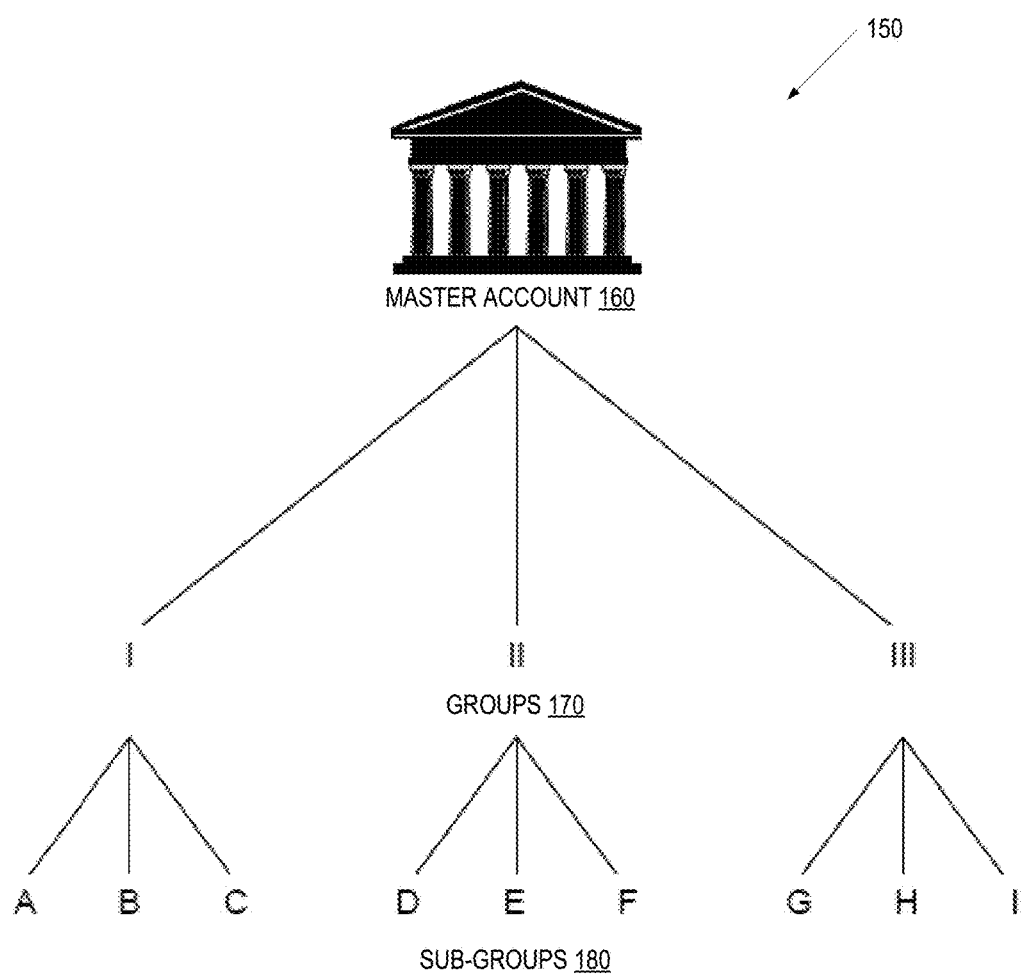
FIG. 1B illustrates a tree diagram demonstrating a master account of a master account holder that includes multiple groups of user accounts.

FIG. 1B illustrates a tree diagram demonstrating a master account 160 of a master account holder that includes multiple groups 170 of user accounts and/or user devices. The master account 160 may belong to an entity such as a corporation or an educational institution such as a school, college or university. The account holder for the master account 160 would be the manager of the master account, and would be able to manage all user devices associated with the master account 160. In some implementations, each group 170 or sub-group 180 may have a different administrator to facilitate management by the account holder. In some implementations, each group or sub-group within the master account is associated with specific content that is made accessible to the devices in the group or subgroup.

The master account 160 may include multiple user accounts, each of which may be tied to a particular user device. Each user account may additionally be assigned to a different member of the entity (e.g., to a teacher, a student, a principal, etc. for an educational institution or to an employee, president, manager, etc. for a corporate entity). Each of the groups 170 (e.g., groups I, II and III) may include a different combination of user accounts. There may be overlap between group membership. For example, if each of groups I, II and III represents a different educational class, and a student is attending all three classes, then that student's user account would be included in each of groups I, II and III.

Each group 170 may be subdivided into one or more subgroups 180. For example, in a classroom setting, a teacher may have three different sections for a class (e.g., group I), each of which includes different students. In such a situation, each section may be associated with a different sub-group (e.g., subgroups A, B and C). Note that there may be overlap between the membership of subgroups 180 as with groups 170.

In an example, the master account holder may be a university, which may offer many different individual courses such as Biology, Calculus, Physical Chemistry, or the like. Each individual course within the university would be a group within the university account. Each individual course may be associated with specific content and policies that differs from other individual courses within the university master account. An individual course may contain further sub-groups. For example, Biology may be divided into multiple sections containing different students or different professors. Each sub-group may be associated with specific content and policies that differ from other sub-groups within a group of an account.

Figure 2:
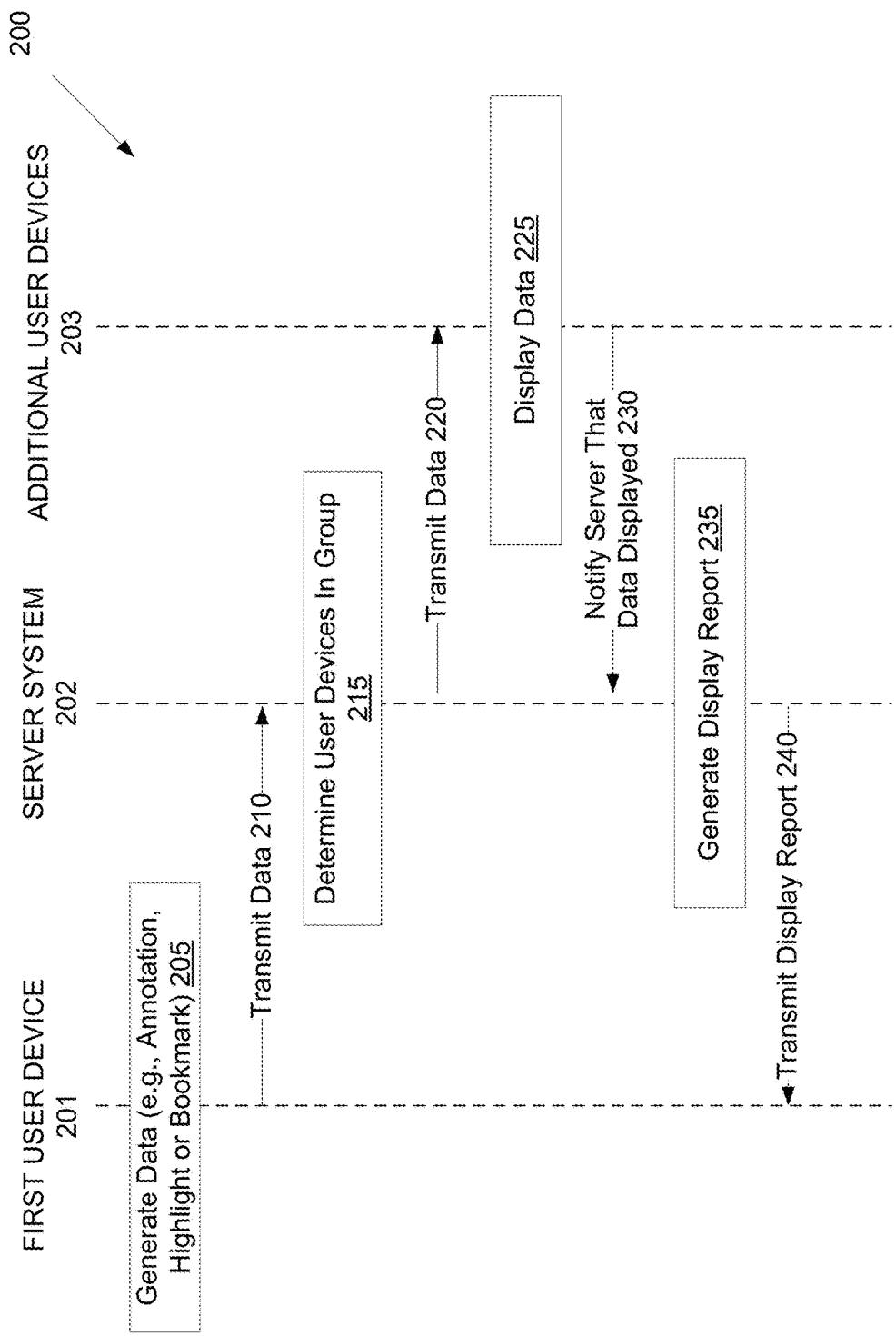
FIG. 2 is a sequence diagram of one embodiment for distributing data from one user device to additional user devices in a group.

FIG. 2 is a sequence diagram of one embodiment for distributing data from one user device to additional user devices in a group. A first user device 201 (e.g., an electronic book reader or a mobile phone) and one or more additional user devices 203 may connect to a server system 202. The first user device 201 loads and renders an electronic publication (e.g., an ebook). The first user device 201 then generates data (e.g., an annotation, note, highlight, problem sets, questions, etc.) associated with the loaded electronic publication based on user input at block 205. At block 210, the first user device 201 transmits the data to the server system 202. The data may be transmitted when the electronic publication closes (e.g., when a user ends a current reading session for the electronic publication), when the data is generated, or at some other time. In one embodiment, a user of the first user device 201 specifies a release date for the data.

The server system 202 may store the data in a repository. Server system 202 may additionally generate a release schedule for the data. The release schedule may identify when the data is to be sent to additional user devices 203, and may be based on a specified release date received from the first user device along with the data.

At block 215, the server system 202 identifies a group that the data is to be sent to. The group may have been specified by a user of the first user device 201, and may be attached to the data as metadata. The server system 202 then determines which user devices are included in the determined group.

At block 220, server system 202 transmits the data to the additional user devices. At some future point in time, those additional user devices 203 may display the data (e.g., alongside the associated electronic publication). In one embodiment, the user devices prompt their users when new data is received. The prompt may include an option to immediately view the data. Users may view the data by responding to the prompt. This may cause the electronic publication to be loaded, and the data to be displayed alongside a passage of the electronic publication that the data is associated with.

Once an additional user device 203 has presented the data, it may additionally notify the server system 202 that the data has been displayed (block 230), or may provide such a notification in response to a user command. The additional user device may also provide reading statistics for the data, such as an amount of time that it was displayed. If the data included questions, problems, problem sets, quizzes, or the like, then the notification may include user answers to such problems. At block 235, the server system generates a display report 235. The display report may indicate a percentage of user devices on which the data has been displayed, individual user devices that have not displayed the data, average display time, standard deviation of display time, and so forth. If the notifications included answers, server system 202 may include correct solutions to the answered problems, and may automatically evaluate the answers as compared to the correct solutions. The display report may additionally include a problem answer report, which may indicate which users correctly answered which questions, statistics regarding the answers to the questions (e.g., percentage of correct answers to each question, and so forth). At block 240, the server system 202 transmits the display report to the first user device 201. Thus, embodiments of the present invention may facilitate management of a classroom environment. Additionally, embodiments may facilitate sharing of data between colleagues (e.g., in a corporation).

Figure 3:
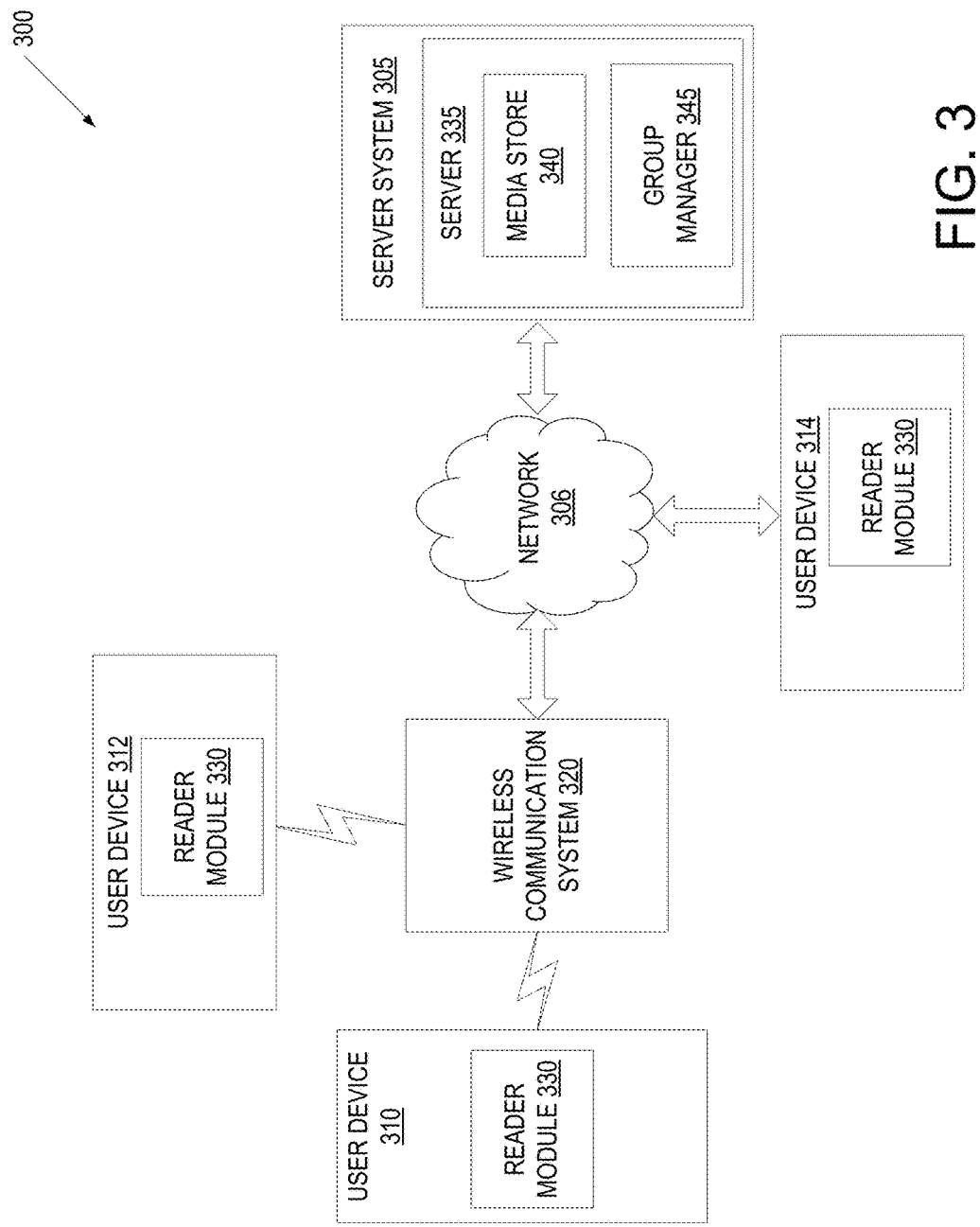
FIG. 3 is a block diagram of an exemplary network architecture, in which embodiments of the present invention may operate.

FIG. 3 is a block diagram of an exemplary network architecture 300, in which embodiments described herein may operate. The network architecture 300 may include a server system 305 and one or more user devices 310-314 capable of communicating with the server system 305 via a network 306 (e.g., a public network such as the Internet, a private network such as a local area network (LAN), or a combination thereof).

The user devices 310-314 may be portable computing devices such as an electronic book reader, notebook computer, mobile phone, tablet computer, personal digital assistant (PDA), portable media player, netbook, and the like. The user devices 310-314 may also be non-portable computing devices such as a desktop computer, a set-top box associated with a television, a gaming console, and so on. The user devices 310-314 may be configured with functionality to enable the viewing of electronic publications.

Some user devices (e.g., user devices 310-312) may be connected to the network 306 and/or to other user devices via a wireless communication system 320. The wireless communication system 320 may be a wireless infrastructure that allows users to use the user devices to communicate with server system 305 without being tethered to the server system 305 via hardwired links. Wireless communications system 320 may be a wireless fidelity (WiFi) hotspot connected with the network 306. Wireless communication system 320 may alternatively be a wireless carrier system (e.g., as provided by Verizon®, AT&T®, T-Mobile®, etc.) that can be implemented using various data processing equipment, communication towers, etc. Alternatively, or in addition, the wireless communication system 320 may rely on satellite technology to exchange information with the user device 310. Other user devices (e.g., user device 314) may be connected to the network via a wired connection (e.g., via an Ethernet connection).

The user devices 310-314 may each be associated with a master account for an entity such as an educational institution or an enterprise and with a user account of a user associated with the entity. Each user account and each associated user device 310-314 may be arranged into one or more groups. Some user accounts may be privileged accounts, which may have privileges to manage user devices that are included in a particular group. For example, a teacher of a school class represented by a group may have privileges to manage user devices that are in the group.

In one embodiment, the user devices 310-314 include a reader module 330. The reader module 330 may render electronic publications and/or other media items for presentation on the user devices 310-314. The electronic publications may include text, tables, digital video (e.g., movies, television, short clips, etc.), images (e.g., art, photographs, etc.), and other multi-media content. The media items may include electronic publications as well as images, audio content (e.g., digital audio files), movies, and so forth.

The server system 305 may include one or more machines (e.g., one or more server computers, routers, gateways, etc.) that have processing and storage capabilities to provide server-based functionality. The server system 305 may be implemented by a single machine or a cluster of machines, each of which may include data stores and/or other data processing equipment. In one embodiment, the server system 305 includes one or more network based servers, which may be hosted, for example, by network based hosting services such as Amazon's® Elastic Compute Cloud® (EC2).

The server system 305 includes a server 335, which may provide network-accessible server-based functionality. In one embodiment, the server 335 provides electronic publications to user devices 310-314 upon the user devices 310-314 accessing a media store 340 provided by the server 335. The user devices 310-314 may access the media store 340, for example, by navigating to particular web pages and selecting electronic publications for purchasing, renting, viewing, etc. The server system 305 delivers, and the user devices 310-314 receive, electronic publications that may include web pages, ebooks, and/or other electronic publications via the network 306. Additionally, a master account holder or privileged account holder may order electronic publications for an entire group of user devices. In response to such an order, the media store 340 may deliver the electronic publication to all user devices in the group (e.g., user devices 310-314).

The server 335 may include a group manager 345 that manages user devices 310-314 at a group and/or master account level. An administrator may send data, updates, instructions, etc. to every user device associated with a master account. Additionally, the administrator or a privileged user in a group may manage user devices in the group. For example, a user of the privileged account for a group may distribute lessons, annotations for electronic publications, highlights, reading assignments, and so forth to the other user devices in the group. Group manager 345 may receive the data or instructions from the privileged account and/or from the master account, and may distribute the data and/or instructions to specified user devices.

Note that embodiments of the present invention may apply to additional architectures other than the illustrated network architecture. For example, embodiments of the present invention may be used in a client server environment in which the server system is a component of a wireless carrier. Embodiments may also apply to peer-to-peer environments, in which one user device sends state data to other user devices for synchronization and distribution rather than relying on the server system 305 to perform the synchronization and distribution.

Figure 4:
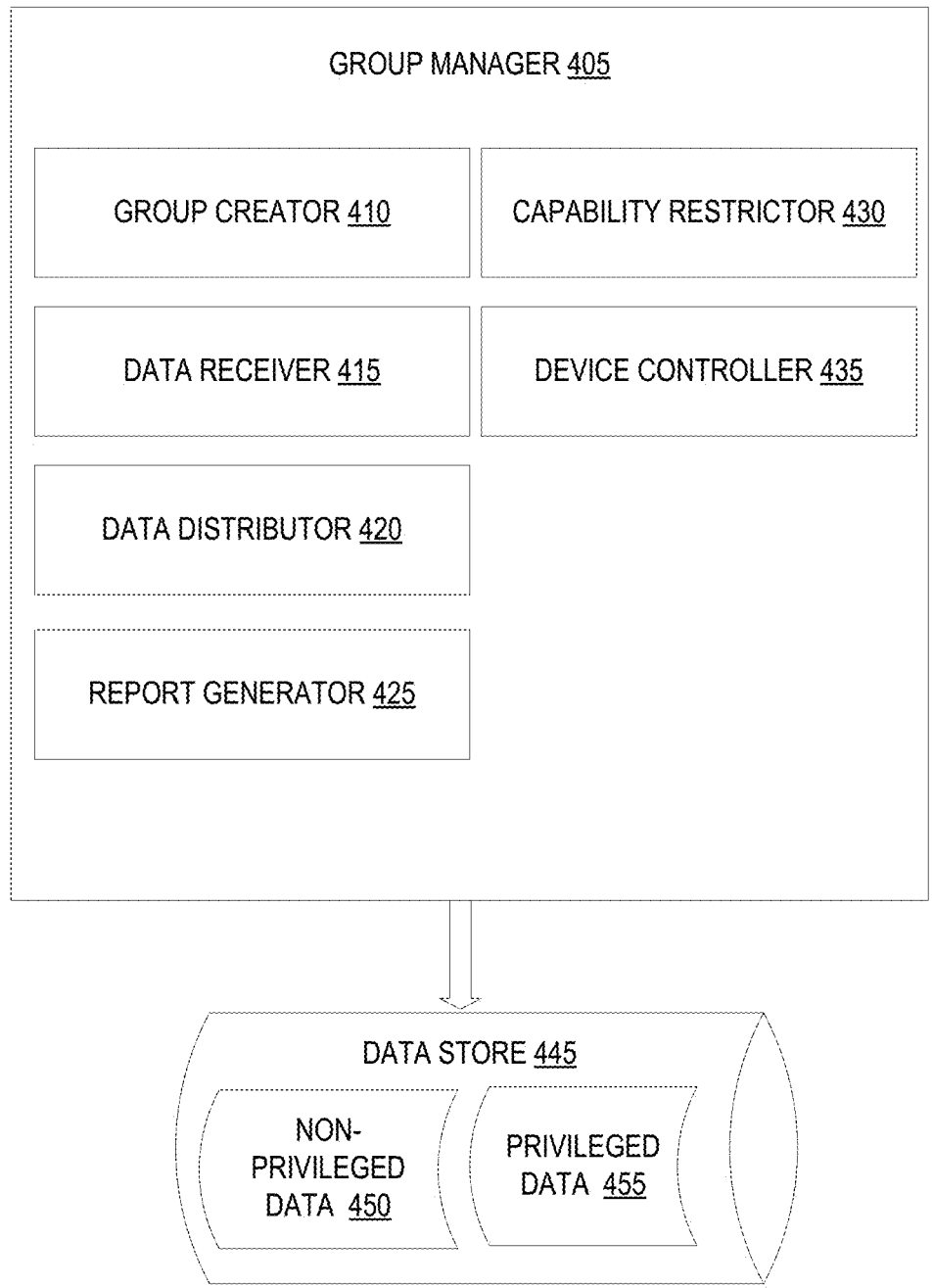
FIG. 4 is a block diagram of one embodiment of a group manager.

FIG. 4 is a block diagram of one embodiment of a group manager 405. In one embodiment, group manager 405 is a component of a server 335, as shown in FIG. 3. In one embodiment, group manager 405 includes a group creator 410, a data receiver 415, a data distributor 420, a report generator 425, a capability restrictor 430 and a device controller 435. In one embodiment, group manager 405 is connected to a data store 445, which may be a file system, database or other data management layer resident on a data storage device such as a disk drive, RAM, ROM, database, etc. The data store 445 may include student generated data 450 (or other data generated by non-privileged sources) and teacher generated data 455 (or other data generated by privileged sources).

Entities such as educational institutions and corporate entities may set up master accounts, which may be associated with many user devices. The devices associated with the master account may be devices that belong to the entities, but that are assigned to students or employees, for example. The user devices associated with a master account may be arranged into a fleet of user devices. An administrator of the master account may then manage the entire fleet of user devices (e.g., via a management portal presented by the group manager 405). For example, data distributor 420 may send data to the entire fleet or to individual devices within the fleet based on commands from an administrator.

Group creator 410 may divide the fleet of user devices into one or more groups of user devices. The groups may be, for example, classes (e.g., for university or school), work units or divisions of a company, interest groups, or other groupings. In addition to being associated with the master account, each user device may be associated with a user account of an individual who will be using that user device. This enables an individual to access content from the user device, or from other user devices or media consumption applications that are also associated with that individual's user account.

Group creator 410 may designate one or more user accounts as privileged accounts. Users of these user accounts may have privileges to send information to, change the settings of, and otherwise control all user devices in a group. For example, if a group is related to a classroom, then a user account of a teacher may be designated as a privileged account.

Group creator 410 may additionally divide a group into sub-groups. Such division may be in response to a command from an administrator of the master account or a command from a privileged account for the group. Any number of sub-groups may be created. For example, sub-groups may be created for study groups in a class, or for different class sections. Once subgroups are created, different data may be sent to subgroups than is sent to groups and/or to other subgroups. A user of a privileged account may assign one or more user devices in a sub-group as a semi-privileged account. The semi-privileged account may have limited control and/or data dissemination capabilities over other user devices in the sub-group and/or to other semi-privileged accounts in other sub-groups. Additionally, sub-groups may further be divided into still smaller sub-groups, and so on.

Data receiver 415 may receive non-privileged data 450, which may be data received from user devices associated with non-privileged user accounts (e.g., student generated data). Data receiver may also receive privileged data 455, which may be data received from user devices associated with privileged accounts (e.g., teacher generated data). Received data may be standalone data (e.g., a lesson plan), or may be data associated with a particular electronic publication or other media item. For example, the data may be an annotation to an electronic publication, highlights to passages of an electronic publication, a voiceover to be played when a passage of the electronic publication is displayed, and so forth.

In response to data receiver 415 receiving the data, it may store the data 450, 455 in data store 445. Additionally, data distributor 420 may distribute the data to all user devices included in a group, to user devices in a subgroup, and so on. The received data may include a release date and/or time. If so, then data distributor 420 may generate a release schedule or add a release date and time for the received data to a release schedule. When the designated date and time is reached, data distributor 420 may transmit the user data to each of the user devices in the group. Alternatively, data distributor 420 may distribute the data to the user devices prior to the release date/time. However, the data may be unavailable on the user devices until the designated date/time is reached. By pre-sending the data, data distributor 420 may ensure that user devices will have the data at the scheduled release date and time even if they lack network connectivity at that time.

If data receiver 415 receives data from non-privileged accounts (non-privileged data 450), data distributor 420 may send the data to the user device of the privileged account. The privileged account holder may then review the data and decide whether to authorize the data to be distributed to the entire group or to one or more subgroups within the group. In response to receiving such authorization, data distributor 420 transmits the data to those user devices in the group and/or sub-groups. Note that data receiver 415 may additionally extract data from user devices rather than waiting for the user devices to send such data.

User devices may send acknowledgements to group manager 405 when the received data is displayed on the user devices. Such acknowledgements may automatically be sent by the user devices, or may be sent upon a user commend from users to send the acknowledgments. Report generator 425 may compile reports of such acknowledgements, and provide the report to a privileged account in the group (e.g., to the user device associated with the privileged account). The reports may include statistics of the number of users who have reviewed the data, how long the data was displayed, individuals who have not viewed the data, average time to view the data, whether the data was not successfully sent to any user devices, and so forth.

In one embodiment, received data 450, 455 includes problem sets or individual questions that are to be answered by students. In such an embodiment, report generator 425 may receive user solutions to the problem sets. In one embodiment, report generator 425 analyzes user's answers to problem sets or questions. This may include analyzing a correctness of a solution. Report generator 425 may compare the user's solution to one or more stored solutions. Based on this comparison, the report generator 425 may determine whether the user correctly answered the problem. Report generator 425 may analyze user answers from multiple different user accounts in a group. Report generator 425 may then generate a report for a problem set that identifies statistical breakdowns for each problem. This may include identifying number of correct answers to a problem, a number of incorrect answers, a percentage of correct answers, a standard deviation, and so forth. Such a report may be sent to the user device associated with a privileged account in the group.

In one embodiment, in addition to confirming receipt and/or review of the data, users can rate a usefulness of the data. For example, users may be provided with a prompt to rate the data on a scale of 1-10. This may provide an indication to the privileged account holder as to whether to use the dame data in the future (e.g., for future classes). Such usefulness ratings may be anonymized. Over time, a large repository of data for a group may be built up (e.g., for a class that is taught yearly). A teacher may use previously stored data for his class, which may have been generated by past teachers of the course.

Note that received data such as annotations, highlights, etc. may have visual indications that identify which user account the data originated from. For example, data from a teacher may have a first gray scale darkness setting or color setting, and data generated by the user of the user device may have a second gray scale darkness or color setting. Alternatively, data may include a textual identifier of an author of the data.

In addition to sending data to user devices in a group, an privileged account holder may restrict the capabilities of user devices in the group and/or actively control the user devices in the group. A user of a privileged user device may be presented with a menu of device capabilities that may be limited, a schedule of when to limit the capabilities, a time limit for the limitations, and so forth. For example, a teacher may restrict a user device's web access, access to data, ability to execute applications such as games or instant message programs, ability to play media, and so forth. In a common example, the teacher may restrict such capabilities during classroom hours, and may reinstate such capabilities outside of classroom hours. Capability restrictor 430 may manage such capabilities of user devices based on commands from the privileged account holder. In one embodiment, capability restrictor 430 sets up a capability restriction schedule that designates when user devices in a group are to have specific capabilities restricted. In another example, a teacher may assign a take home open book test. However, he may not want his provided annotations or other user annotations to be available during the test. Accordingly, he may disable an ability to view annotations until the test is over.

In one embodiment, device controller 435 may place user devices in a group into a slave mode in response to a command from the privileged user device in the group. While in the slave mode, anything that is displayed in the privileged user device will also be displayed in all of the other user devices in the group (or in a designated subgroup). For example, while user devices in a group are placed into the slave mode, if the privileged user device opens a particular electronic publication to a particular page, then all the other user devices in the group open that electronic publication to that particular page. When the privileged user device changes the page, then a change page commend is sent to the group manager 405, and the device controller 435 issues a command to all the other user devices in the group to change pages as well. In one embodiment, users of the user devices may still enter notes, make highlights, and so forth during slave mode. Such notes, highlights, etc. will then be associated with whatever material was presented at the time that the notes or highlights were made.

In one embodiment, device controller 435 automatically reverts the user devices to a standard operating mode a predetermined amount of time (e.g., 1 hour) after it places them into a slave mode. A privileged account holder may be prompted to extend the duration of the slave mode prior to reverting the user devices to standard mode.

The aforementioned user accounts will typically be associated with a master account. In a school setting, a student may be assigned a user account and associated user device his freshman year. Once the student graduates, the user device may be returned to the school, and the school may reassign the user account and user device to a new student. When such a change in the assigned user occurs, group manager 405 may return the user device and user account to an original state. This may include removing data, user installed applications, electronic publications, and so forth form the user device. In one embodiment, group manager 405 stores the data that is removed from the user device. The previous user may then associate that data with a new user account that is the personal property of the user. Therefore, the user may not lose his data that accumulated throughout his time in school.

Figure 5:
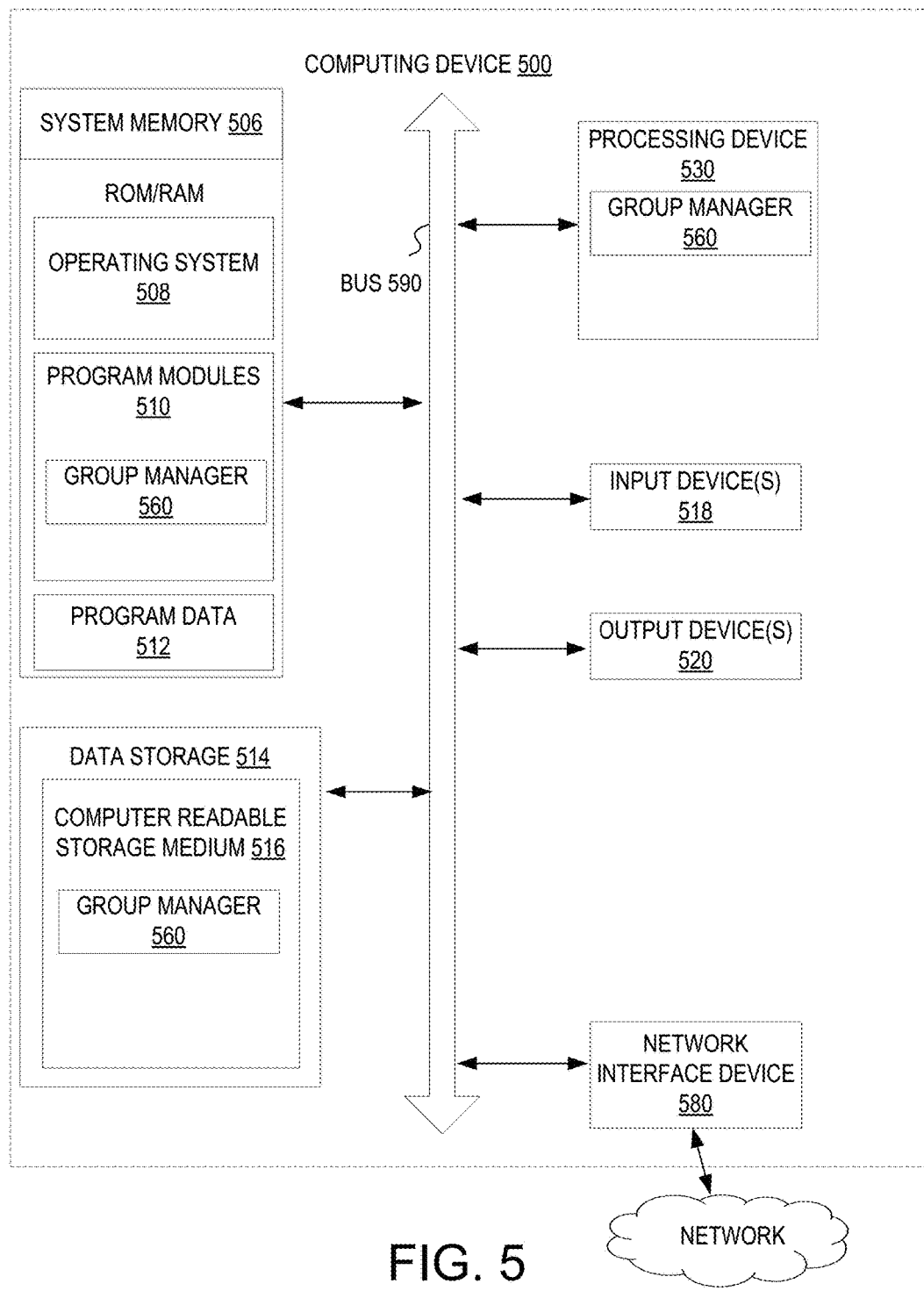
FIG. 5 is a block diagram illustrating an exemplary computing device, in accordance with one embodiment of the present invention.

FIG. 5 is a block diagram illustrating an exemplary computing device 500, in accordance with one embodiment of the present invention. The computing device 500 may correspond to a computing device of server system 305 of FIG. 3 and may be any type of computing device such as a laptop computer, a rackmount server, a desktop computer, a mobile phone, and the like.

The computing device 500 includes a processing device 530, which may include one or more processors such as CPUs, microcontrollers, field programmable gate arrays, or other types of processors. The computing device 500 also includes system memory 506, which may correspond to any combination of volatile and/or non-volatile storage mechanisms. The system memory 506 stores information which provides an operating system component 508, various program modules 510 such as reader module 560, and/or other components (e.g., a web browser). The computing device 500 performs functions by using the processing device 530 to execute instructions provided by the system memory 506.

The computing device 500 also includes a data storage device 514 that may be composed of one or more types of removable storage and/or one or more types of non-removable storage. The data storage device 514 includes a computer-readable storage medium 516 on which is stored one or more sets of instructions embodying any one or more of the methodologies or functions described herein. As shown, instructions for the group manager 560 may reside, completely or at least partially, within the computer readable storage medium 516, system memory 506 and/or within the processing device 530 during execution thereof by the user device 500, the system memory 506 and the processing device 530 also constituting computer-readable media. The computing device 500 may also include one or more input devices 518 (keyboard, mouse device, specialized selection keys, etc.) and one or more output devices 520 (displays, printers, audio output mechanisms, etc.).

The computing device 500 may also include a network interface device 580 such as a network interface card (NIC) to allow computing user device 500 to communicate via a network with other computing devices, such as user devices.

Figure 6:
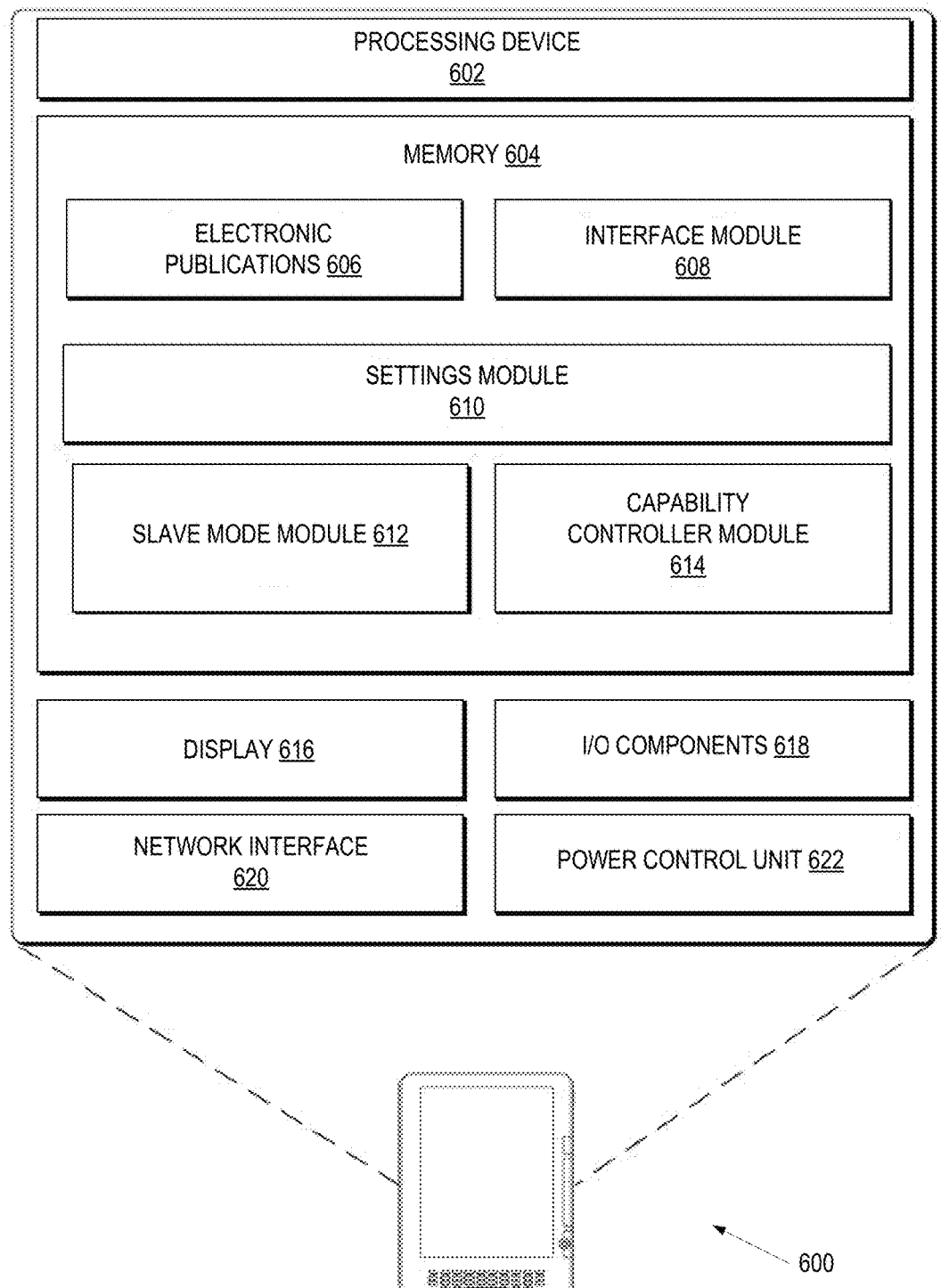
FIG. 6 is a block diagram illustrating an exemplary user device, in accordance with one embodiment of the present invention.

FIG. 6 is a block diagram illustrating an exemplary user device 600, in accordance with one embodiment of the present invention. In this example, the device is shown as a dedicated, handheld eBook reader device. However, other user devices may implement the described techniques and may include some or all of the functionality described herein.

The basic configuration of user device 600 includes a processing device 602 (which may include one or more processors) and memory 604. Memory 604 may include volatile and nonvolatile memory. Thus, the memory 604 may include, but is not limited to, RAM, ROM, EEPROM, flash memory, or other memory technology. The memory 604 may be used to store any number of functional components that are executable on the processing device 602, as well as data and content items that are rendered by user device 600. Thus, the memory 604 may store an operating system and a storage database to store electronic publications 606 and/or other media items (e.g., audio books, songs, videos, still images, and the like).

An interface module 608 may also be provided in memory 604 and may be executed on the processing device 602 to provide for user operation of user device 600. The interface module 608 may facilitate textual entry of requests (e.g., via a cursor, controller, keyboard, etc.), audible entry of requests (e.g., via a microphone), or entry of requests in any other manner.

The memory 604 may also include a settings module 610 to facilitate personalization of user device 600 to the user. Example settings stored in the setting module 610 may include device registration, device name, Wi-Fi settings, device password, and the like. Settings module 610 may also lock one or more settings that may be provided by an administrator or privileged account in a group. For instance, when an administrator or teacher requests to implement a preferred setting on each user device in a group, settings module 610 may receive a signal from a server and implement the setting on the user device 600.

Memory 604 may additionally include a slave mode module 612 and a capability controller module 614. Slave mode module 612 may place the user device 600 into a slave mode in response to receiving a command from a server or directly from a privileged user device. While in the slave mode, a user's control options of the user device may be limited. For example, the user may not be able to change pages, open applications, close an electronic publication, etc. Moreover, while in slave mode, the user device 600 may receive commands from the privileged user device or from the server that cause the user device to perform operations such as open publications, change pages, play media, and so forth. These commands may reflect actions that are being performed on the privileged user device.

Capability controller module 614 may control the capabilities of the user device 600. Capability controller module 614 may include a schedule that designates what capabilities are permitted at what times. For example, user devices in a group may be restricted from web access during school hours. Alternatively, or additionally, capabilities may be associated with geographic locations. For example, the user device may include a location determining module (not shown), such as a global positioning system (GPS) receiver. If the user device in on a school campus, then particular device capabilities may be restricted. Additionally, multiple criteria may be used to determine whether to restrict device capabilities. For example, device capabilities may be restricted during school hours if the user device is detected to be on a school campus. In another example, capabilities of user devices may be restricted when they are within a certain proximity of the privileged user device. Capability controller module 614 may additionally receive commands from a master user device or master account to restrict device capabilities at any time.

User device 600 may include a display 616, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable liquid crystal displays (LCDs), micro-electrical-mechanical systems (MEMS), cholesteric, pigmented electrophoretic, and others. In other implementations, or for other types of devices, the display may be embodied using other technologies, such as LCDs and organic light emitting diodes (OLEDs), and may further include a touch screen interface. In some implementations, a touch sensitive mechanism may be included with the display to form a touch-screen display.

User device 600 may further be equipped with various input/output (I/O) components 618. Such components may include various user interface controls (e.g., buttons, a joystick, a keyboard, etc.), a camera, a bar code reader, audio speakers, connection ports, and so forth. A network interface 620 supports both wired and wireless connection to various networks, such as cellular networks, radio, Wi-Fi networks, short range networks (e.g., Bluetooth), IR, and so forth. The network interface device 620 may be a wireless modem that allows the user device 600 to handle both voice and non-voice communications (such as communications for text messages, multimedia messages, media downloads, web browsing, etc.) with a wireless communication system. The wireless modem may provide network connectivity using any type of mobile network technology.

The user device 600 also includes a power control unit 622, which may include a battery. The power control unit 622 operatively controls an amount of power, or electrical energy, consumed by the device. Actively controlling the amount of power consumed by the reader device may achieve more efficient use of electrical energy stored by the battery.

User device 600 may have additional features or functionality. For example, the user device 600 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

FIGS. 7-10 are flow diagrams of various implementations of methods related to managing a group of user devices. The methods are performed by processing logic that may include hardware (circuitry, dedicated logic, etc.), software (such as is run on a general purpose computer system or a dedicated machine), or a combination of both. In one implementation, the methods may be performed by group manager 405 of FIG. 4, which may be incorporated into a server system.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 7:
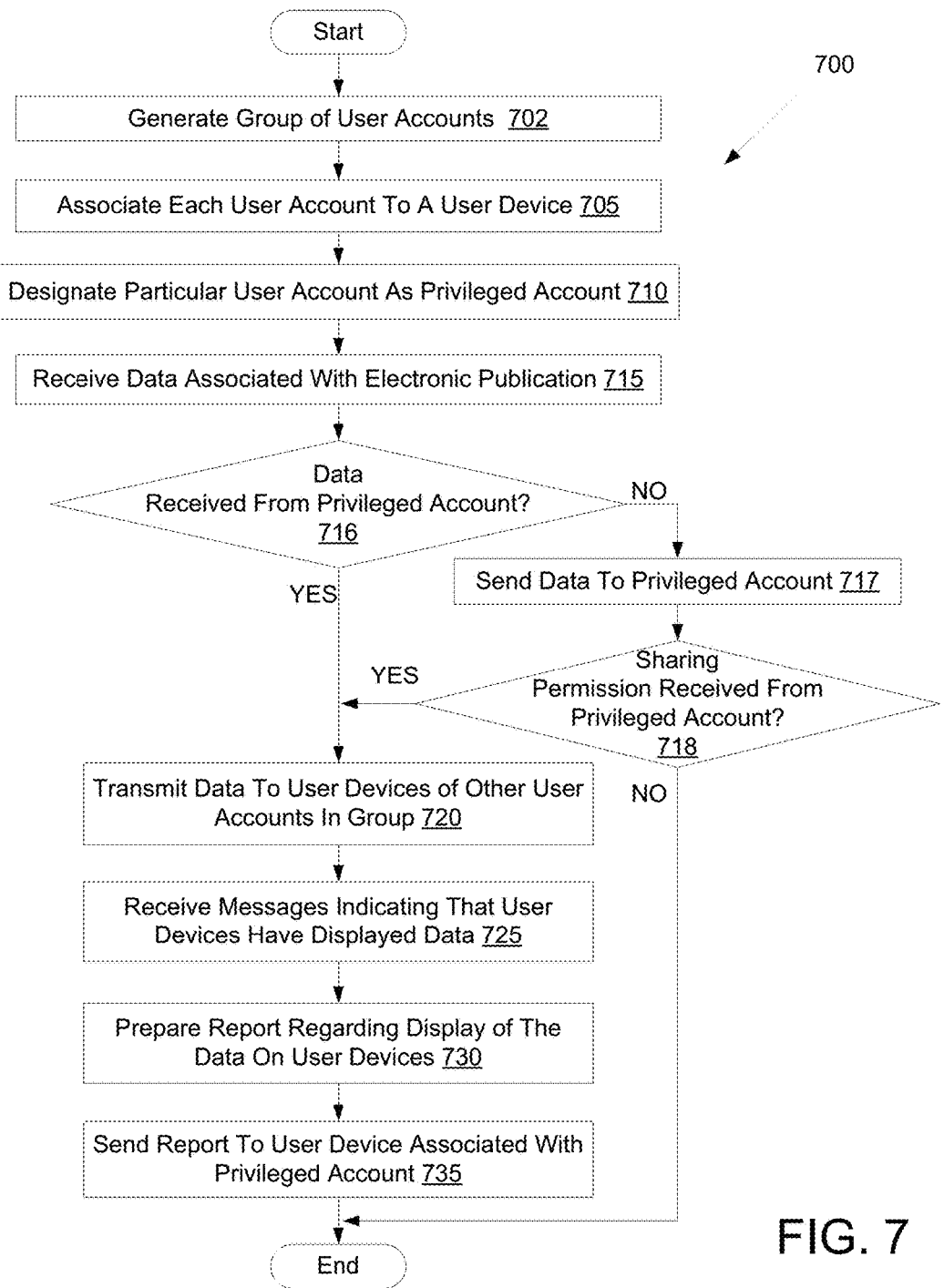
FIG. 7 is a flow diagram of one embodiment for a method of distributing data from a user device of a privileged account in a group to user devices of additional user accounts in the group.

FIG. 7 is a flow diagram illustrating one embodiment for a method 700 of distributing data from a privileged user device in a group to a collection of non-privileged user devices in the group. At block 702 of method 700, processing logic generates a group of user accounts. Each user account may be associated with a master account that has some degree of control over the user accounts. At block 705, processing logic associates each user account to a user device. In an alternative embodiment, processing logic may first generate a group of user devices, each of which may be associated with the same master account, and may then associate each user device to a particular user account.

At block 710, processing logic designates a particular user account in the group as a privileged account. From the privileged account, a user may send data to user devices of other non-privileged user accounts, may control those other user devices, may restrict capabilities of those other user devices, and so on.

At block 715, processing logic receives data (e.g., annotations, notes, highlights, etc.) associated with an electronic publication. At block 716, processing logic determines whether the data was received from a privileged account. For example, the data may be received from a privileged device associated with the privileged account, from a web interface through which the user may have logged into the privileged account, or from other user devices. Alternatively, the data may be received from a user device associated with a non-privileged account. If the data was received from a privileged account, the method proceeds to block 720. Otherwise, the method continues to block 717.

At block 717, processing logic sends the data to the privileged account. At block 718, processing logic determines whether the privileged account has granted sharing permission for the data. If so, then the method continues to block 720. Otherwise, the method ends. Additionally, processing logic may send a message back to the user account from which the data originated that the user account does not have permission to share the data.

At block 720, processing logic transmits the data to user devices of other user accounts in the group. At block 725, processing logic receives messages from one of more of the user devices indicating that those user devices have displayed the data. At block 730, processing logic prepares a report regarding the display of the data on the user devices. At block 735, processing logic sends the report to the user device associated with the privileged account. The data may also be stored by processing logic, and may be viewed by the privileged account holder via any user device or web interface that can log into the privileged account.

Figure 8:
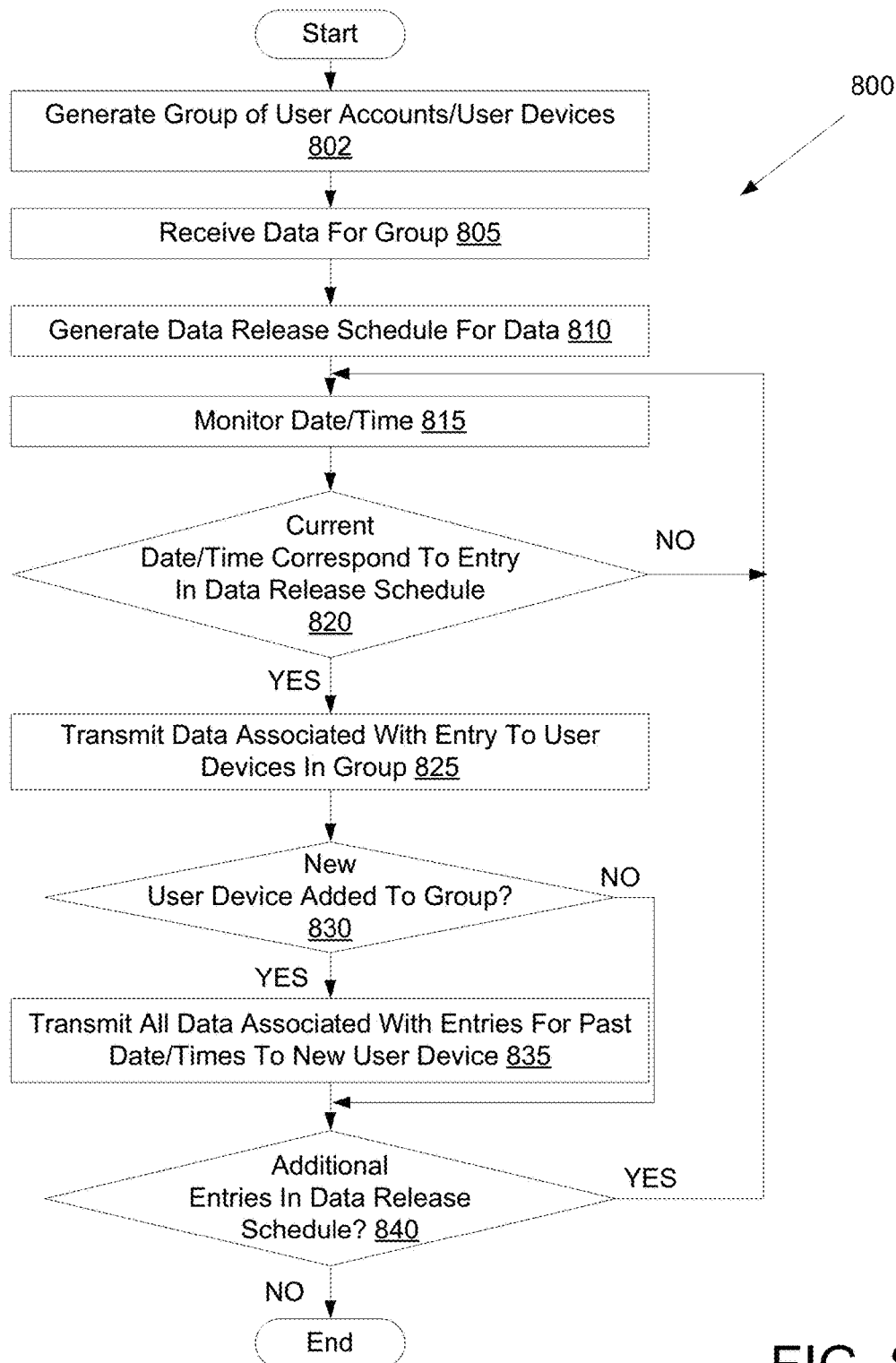
FIG. 8 is a flow diagram of another embodiment for a method of distributing data from a user device of a privileged account in a group to user devices of additional user accounts in the group.

FIG. 8 is a flow diagram of another embodiment for a method of distributing data from a user device of a privileged account in a group to user devices of additional non-privileged user accounts in the group. At block 802 of method 800, processing logic generates a group of user accounts and/or user devices. At block 805, processing logic receives data for the group. The data may be received, for example, from a privileged user device of the group. At block 810, processing logic generates a data release schedule for the data. The data release schedule may indicate when to send specific data to user devices in the group. Alternatively, the data may be sent to the user devices in advance, and the data release schedule may indicate when to reveal the data that is already on the user devices. The data release schedule may be generated based on input from a privileged user account.

At block 815, processing logic monitors a date and time. At block 820, processing logic determines whether a current date and time correspond to an entry in the data release schedule. If so, the method continues to block 825. Otherwise, the method returns to block 815.

At block 825, processing logic transmits the data associated with the entry to the user devices in the group. Alternatively, as mentioned, the data may have been pre-sent to the user devices. In such an embodiment, processing logic may send a command to display the previously sent data to the user devices. Alternatively, the user devices may include a copy of the data release schedule, and may determine to reveal the data without receiving any communication from the processing logic.

At block 830, processing logic determines whether any new user devices and/or user accounts have been added to the group. If so, the method continues to block 835. Otherwise, the method proceeds to block 840. At block 835, processing logic transmits all data associated with entries for past dates and times to the new user device. These entries for data that has already been released to other user devices in the group may be immediately viewable on the new user device.

At block 840, processing logic determines whether there are any additional entries in the data release schedule. If so, the method returns to block 815. Otherwise, the method ends.

Figure 9:
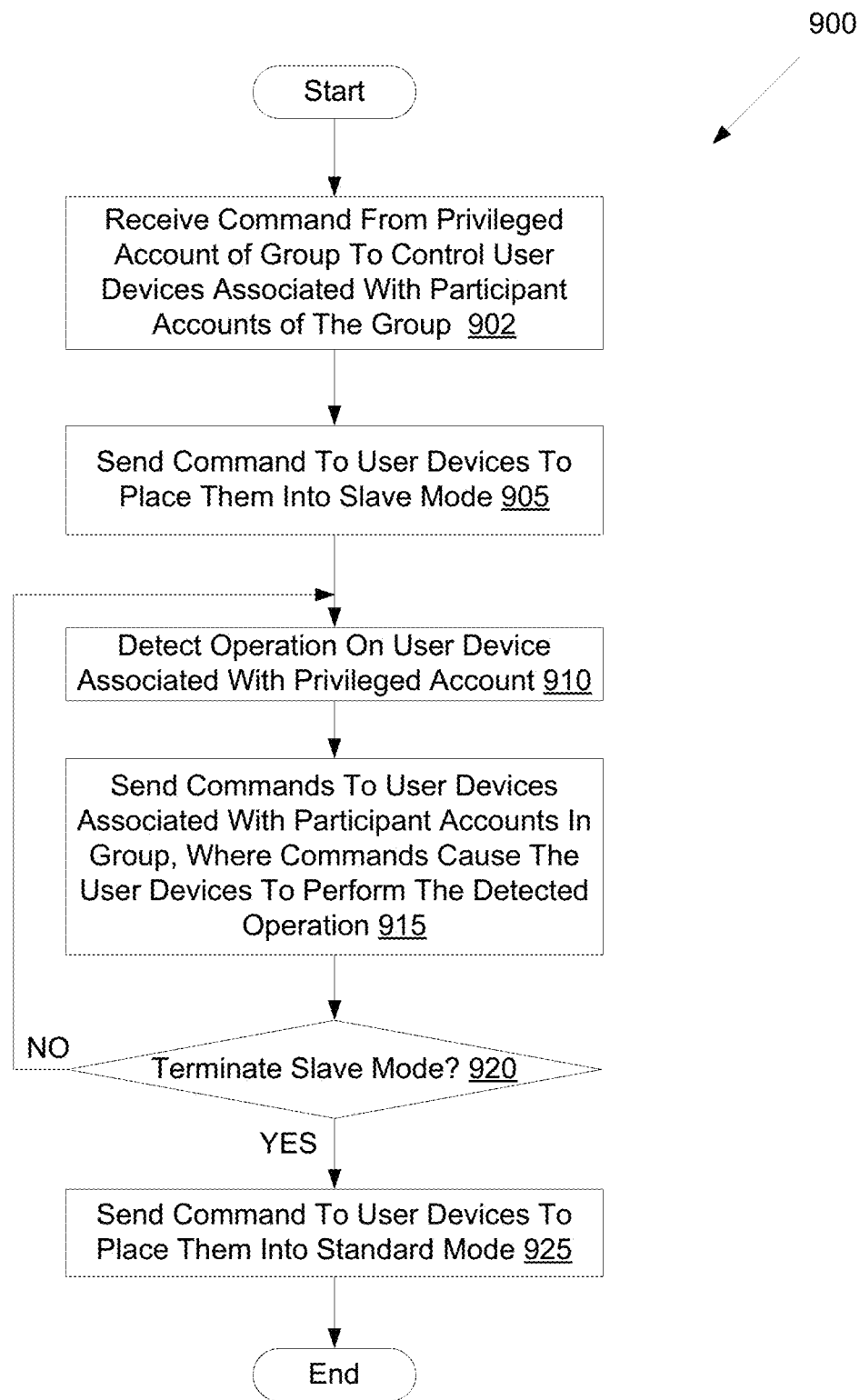
FIG. 9 is a flow diagram of one embodiment for a method of controlling the presentation of data on user devices arranged in a group.

FIG. 9 is a flow diagram of one embodiment for a method of controlling the presentation of data on user devices arranged in a group. At block 902, processing logic receives a command from a privileged account in the group to control all of the user devices in the group (or in a subgroup), each of which may be associated with a participant account (also known as non-privileged account). The command may be received from a user device associated with the privileged account.

At block 905, processing logic sends a command to the user devices to place them into a slave mode. While in the slave mode, users of these devices may not launch applications, change pages, load electronic publications, and so forth. Instead, commands to perform such operations may originate from the user device of the privileged account holder. At block 910, processing logic detects an operation on the user device associated with the privileged account. At block 915, processing logic sends commands to the user devices associated with the non-privileged accounts in the group. These commands cause the user devices to perform the detected operation (e.g., load an application, load an electronic publication, change a page of an electronic publication, etc.).

At block 920, processing logic determines whether to terminate slave mode. Slave mode may be terminated, for example, based on a command from the user device of the privileged account holder. Additionally or alternatively, a timer may be set when the user devices are placed into slave mode. The user devices may automatically exit slave mode if the timer elapses. This may ensure that user devices are not accidently left in slave mode. If processing logic is to terminate slave mode, the method proceeds to block 925, and processing logic sends a command to the user devices to place them into a standard mode (to terminate slave mode). The user devices may also automatically terminate slave mode without receiving any instruction from processing logic if, for example, a time period has elapsed. Otherwise, the method returns to block 910.

Figure 10:
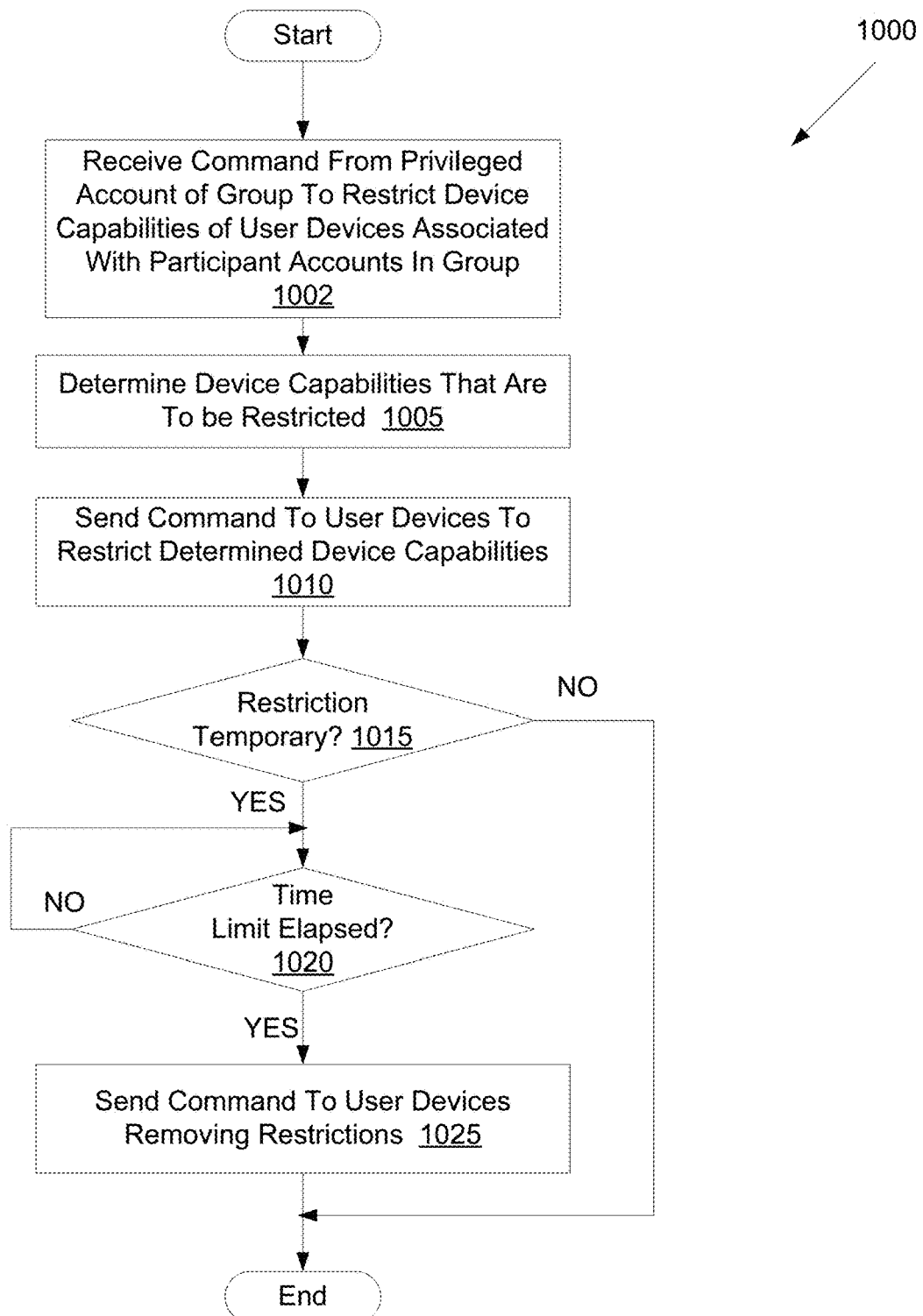
FIG. 10 is a flow diagram of one embodiment for a method of restricting capabilities of user devices arranged in a group.

FIG. 10 is a flow diagram of one embodiment for a method of restricting capabilities of user devices arranged in a group. At block 1002, processing logic receives a command from a privileged account in a group to restrict device capabilities of user devices associated with participant accounts in the group. At block 1005, processing logic determines capabilities that are to be restricted. The received command may have indicated which capabilities to restrict. Alternatively, processing logic may prompt a privileged account holder to select capabilities to restrict, or may have a preset restriction policy that it applies.

At block 1010, processing logic sends a command to the user devices to restrict the determined capabilities. At block 1015, processing logic determines whether the restriction is temporary. If the restriction is permanent, the method ends. If the restriction is temporary, the method continues to block 1020.

Temporary restrictions may have a time limit associated with them. At block 1020, processing logic determines whether the time limit associated with a restriction has elapsed. If not, the method loops back to block 1020. When the time limit does elapse, the method continues to block 1025, and a command is sent to the user device to remove the restrictions. Alternatively, the user devices may each be sent a copy of the time limit. In such an embodiment, the user devices may automatically lift the restrictions without receiving a command from processing logic.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "designating", "receiving", "transmitting", "reporting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, from a first device associated with a first user account, data comprising at least one of an annotation to a content of a media item, a bookmark to a section of the content of the media item, or a highlight of a passage of the content of the media item;
transmitting the data to a second device associated with a second user account;
receiving, from the second device, display information associated with presentation of the data comprising the at least one of the annotation, the bookmark, or the highlight on the second device;
generating, by one or more processors, a report comprising statistics associated with the display information, the statistics comprising an amount of time for which the at least one of the annotation, the bookmark, or the highlight was presented on the second device; and
sending the report indicating the amount of time for which the at least one of the annotation, the bookmark, or the highlight was presented on the second device to the first device which generated the at least one of the annotation, the bookmark, or the highlight.

2. The method of claim 1, further comprising:
receiving one or more confirmations that the data has been presented on the second device.

3. The method of claim 1, wherein receiving the display information comprises receiving the display information associated with presentation of the data generated by an instructor of a class that has data sharing privileges.

4. The method of claim 1, wherein receiving the display information comprises receiving the display information from an employee of an enterprise.

5. The method of claim 1, further comprising:
determining a release date for the data based on review of a data release schedule, wherein the data is transmitted to the second device associated with the second user account on the release date.

6. The method of claim 1, further comprising:
receiving a command from the first user account to restrict designated capabilities of the second device; and
restricting the designated capabilities from the second device.

7. The method of claim 1, wherein receiving the display information comprises receiving the display information associated with the presentation of an annotation associated with one or more passages of the media item, the annotation generated by a privileged account.

8. The method of claim 1, further comprising:
determining that a new user account associated with a new device has joined a group; and
sending the data to the new device.

9. The method of claim 1, further comprising:
receiving a request from a third user account that lacks sharing privileges to share additional data with a group;
forwarding the request to the first user account, the first user account having the sharing privileges;
receiving authorization from the first user account; and
distributing the additional data to devices associated with the group.

10. The method of claim 1, further comprising:
receiving a request from the first user account to control the second device associated with the second user account;
detecting that the first device associated with the first user account has opened the media item to a particular page; and
causing the second device associated with the second user account to open the media item to the particular page.

11. A computing device comprising:
a memory; and
one or more processors coupled to the memory, the one or more processors to:
receive, from a first device, data comprising at least one of an annotation to a content of a media item, a bookmark to a section of the content of the media item, or a highlight of a passage of the content of the media item;
transmit the data to one or more devices in a group of devices;
receive, from the one or more devices in the group, display information associated with presentation of the data comprising the at least one of the annotation, the bookmark, or the highlight on the one or more devices in the group;
generate a report comprising statistics associated with the display information, the statistics comprising an amount of time for which the at least one of the annotation, the bookmark, or the highlight was presented on the one or more devices in the group; and
send the report indicating the amount of time for which the at least one of the annotation, the bookmark, or the highlight was presented on the second device to the first device which generated the at least one of the annotation, the bookmark, or the highlight.

12. The computing device of claim 11, wherein the one or more processors further to:
receive one or more confirmations that the data has been presented on the one or more devices in the group.

13. The computing device of claim 11, wherein the statistics associated with the display of the data further comprise at least one of a percentage of the one or more devices in the group on which the data has been displayed or an indication of those of the one or more devices in the group on which the data has not been displayed.

14. The computing device of claim 11, wherein the data comprises a problem to be solved, and the one or more processors further to:
receive solutions to the problem from the one or more devices, wherein the report comprises the solutions to the problem.

15. The computing device of claim 11, wherein the data comprises a voiceover associated with a passage of the media item that is played on the one or more devices when the passage is presented.

16. The computing device of claim 11, wherein the data comprises a visual indication identifying that the data originated from a first user account associated with the first device.

17. The computing device of claim 11, wherein the one or more processors further to:
generate a subgroup within the group, the subgroup comprising a privileged account and one or more non-privileged accounts, wherein the at least one of the annotation, the bookmark, or the highlight was generated by the privileged account; and
send a different annotation to the subgroup than is sent to the group.

* * * * *